J. B. SKINNER.
Plow-Colter.

No. 66,260.  Patented July 2, 1867.

Witnesses:
Battis DeLong
J. W. Mister

Inventor:
J. B. Skinner
by his Attys
Baldwin Hon

United States Patent Office.

JAMES B. SKINNER, OF ROCKFORD, ILLINOIS.

Letters Patent No. 66,260, dated July 2, 1867.

IMPROVEMENT IN PLOUGHS.

*The Schedule referred to in these Letters Patent and making part of the same.*

TO ALL WHOM IT MAY CONCERN:

Be it known that I, JAMES B. SKINNER, of Rockford, in the county of Winnebago, and State of Illinois, have invented certain new and useful Improvements in Ploughs, of which the following is a full, clear, and exact description, reference being had to the accompanying drawings, which make part of this specification.

Coulters as heretofore constructed have been pivoted to a plough-beam in such manner as to leave the coulter free to swing round without restraint. This method of construction I have found by experiment to be defective, as, in turning, the horses are liable to back into the coulter as it swings round and injure themselves, or in the case of gang-ploughs, the coulters, when lifted in turning, are apt to swing forward and cut into the axle or other parts of the machine.

Now it is the object of my invention to obviate the above-named and other objections to the use of swivelling coulters, and to this end the improvements herein claimed consist in so connecting a swivelling coulter to a plough-beam as to limit its lateral vibration and yet allow the coulter to be adjusted both vertically and laterally on the beam.

In the accompanying drawings I have shown several modes of carrying out the object of my invention; each of the figures showing a different modification of my improvement. The plough-beam is shown in red in all the figures, and lettered A; in each figure a coulter, C, is supposed to be pivoted to a swivelling bearing or caster-yoke, B, forming part of a spindle, $b$, as in Fig. 1.

Figure 1 shows the caster-yoke fitted on the square end of a horizontal spindle, O, between two cam-planes or wedge-blocks $o$ which limit its lateral vibration. The spindle is round and turns axially in half round boxes $p\,p$, (to allow the coulter to move vertically,) which are supported under the beams by loops, $p'$, and a cross-bar, P. The boxes can be tightened on the beams by nuts and screws. The spindle O can be moved endwise in the boxes to adjust the coulter laterally.

By allowing the coulter to swivel it is enabled to follow the movements of the beam with less friction, while by limiting its vibration I prevent it from turning so far as to injure the team or interfere with the working of the plough; while the facilities afforded by my invention for both vertical and lateral adjustments of the coulter enable me readily to adapt it to the varying conditions under which it is required to work.

My improvements have been described as applied to a rolling coulter; it is, however, obvious that they are equally applicable to a curved cutting coulter.

What I claim as my invention, and desire to secure by Letters Patent, is—

Figure 1:
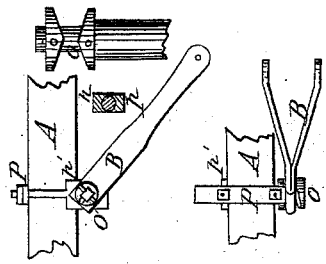

1. The combination of the caster-yoke with the horizontal caster-spindle, as shown in fig. 1.

Figure 2:
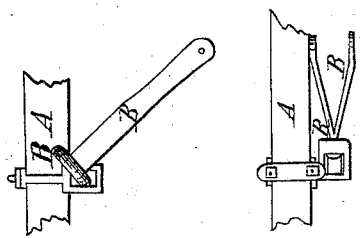
Figure 2 shows a device similar to fig. 1, except that a loop, R, is formed on the end of the spindle, and that the caster-yoke plays laterally on a vertical pin in the loop, the sides of the loop limiting the lateral play of the coulter. This device is valuable as it prevents the coulter from wabbling on the spindle, the pin always keeping it vertical.

2. The combination of the caster-yoke with the horizontal caster-spindle by pivoting the yoke on a vertical pin in the loop on the spindle, as shown in fig. 2, for the purpose of preventing wabbling of the coulter, and yet leave it free to vibrate laterally.

Figure 3:
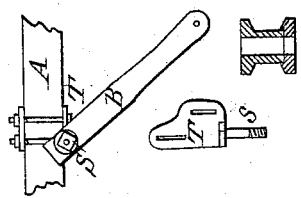
Figure 3 shows the caster-yoke arranged on a collar fitting on the end of a spindle, $s$, secured to a laterally adjustable slotted bracket plate, T; the coulter-yoke being held at any desired elevation by a nut and screw on the end of the spindle.

3. The combination of the caster-yoke with the squared thimble turning on the fixed spindle projecting from the bracket-plate, as shown in fig. 3.

4. The combination, substantially as described, with the horizontal caster-spindle O, of the double half round boxes $p$, (suspended in the loops $p'$,) and a cross-bar, P, for the purposes set forth.

In testimony whereof I have hereunto subscribed my name.

JAMES B. SKINNER.

Witnesses:
WHEELER MEAD,
H. M. SKINNER.